US 9,124,312 B2

(12) United States Patent
Hatakeyama

(10) Patent No.: US 9,124,312 B2
(45) Date of Patent: Sep. 1, 2015

(54) COMMUNICATION DEVICE, READER/WRITER DEVICE, COMMUNICATION SYSTEM, AND COMMUNICATION METHOD

(75) Inventor: Koichi Hatakeyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1001 days.

(21) Appl. No.: 13/114,138

(22) Filed: May 24, 2011

(65) Prior Publication Data

US 2011/0294428 A1    Dec. 1, 2011

(30) Foreign Application Priority Data

Jun. 1, 2010  (JP) ................................ P2010-126017

(51) Int. Cl.
*H04B 5/00* (2006.01)
(52) U.S. Cl.
CPC ............ *H04B 5/0056* (2013.01); *H04B 5/0037* (2013.01)
(58) Field of Classification Search
CPC ........ H04B 1/005; H04B 5/0056; H04B 7/00; H04B 7/0426; H04W 36/00; H04W 36/0038
USPC ............... 455/41.1, 41.2, 62, 66.1, 88, 550.1, 455/552.1, 553.1; 340/10.1, 4.42, 10.3, 340/12.3, 10.51
See application file for complete search history.

(56) References Cited

U.S. PATENT DOCUMENTS

| 8,374,548 | B2 * | 2/2013 | Parkkinen et al. | ........... 455/41.2 |
| 8,504,434 | B2 * | 8/2013 | Hatakeyama | ............... 705/26.1 |
| 2006/0258289 | A1 * | 11/2006 | Dua | .............................. 455/41.3 |
| 2009/0102614 | A1 * | 4/2009 | Koyama et al. | ............ 340/10.51 |
| 2009/0227282 | A1 | 9/2009 | Miyabayashi et al. | |
| 2010/0137024 | A1 * | 6/2010 | Maguire | ..................... 455/552.1 |
| 2010/0235497 | A1 * | 9/2010 | Sato | ............... 709/224 |
| 2011/0050164 | A1 * | 3/2011 | Partovi et al. | ................. 320/108 |
| 2011/0183614 | A1 * | 7/2011 | Tamura | ........................ 455/41.2 |
| 2013/0329259 | A1 * | 12/2013 | Yokota | ......................... 358/1.15 |

FOREIGN PATENT DOCUMENTS

| JP | 2003-284137 A | 10/2003 |
| JP | 2005-117551 A | 4/2005 |
| JP | 2009-218845 A | 9/2009 |

* cited by examiner

*Primary Examiner* — Andrew Wendell
(74) *Attorney, Agent, or Firm* — Hazuki International, LLC

(57) ABSTRACT

There is provided a communication device including a secure communication unit configured to perform secure communication with an external reader/writer device, the secure communication being secure close-proximity communication, a first communication unit configured to perform high-speed communication with the reader/writer device, the high-speed communication being close-proximity communication that is faster than the secure communication, a second communication unit configured to, when communication via the high-speed communication is disconnected, communicate with the reader/writer device with a communication mode that is different from a communication mode of the high-speed communication, a power transmission unit configured to receive power transmitted from the reader-writer device by power transmission, and a secondary battery configured to store the power received by the power transmission unit. The second communication unit may be configured to, when communication via the high-speed communication is disconnected, operate with the power stored in the secondary battery.

10 Claims, 7 Drawing Sheets

FIG.5

| 500 CARD MEDIUM STRUCTURE INFORMATION | |
|---|---|
| HIGH-SPEED WIRELESS COMMUNICATION REVISION | 510 |
| HIGH-SPEED WIRELESS COMMUNICATION MODE | 511 |
| MEDIUM-RANGE WIRELESS COMMUNICATION REVISION | 520 |
| MEDIUM-RANGE WIRELESS COMMUNICATION MODE | 521 |
| MEDIUM-RANGE WIRELESS COMMUNICATION PROTOCOL | 523 |
| MEDIUM-RANGE WIRELESS COMMUNICATION ANTENNA SHAPE | 524 |
| MEDIUM-RANGE WIRELESS COMMUNICATION ATTRIBUTES | 524 |

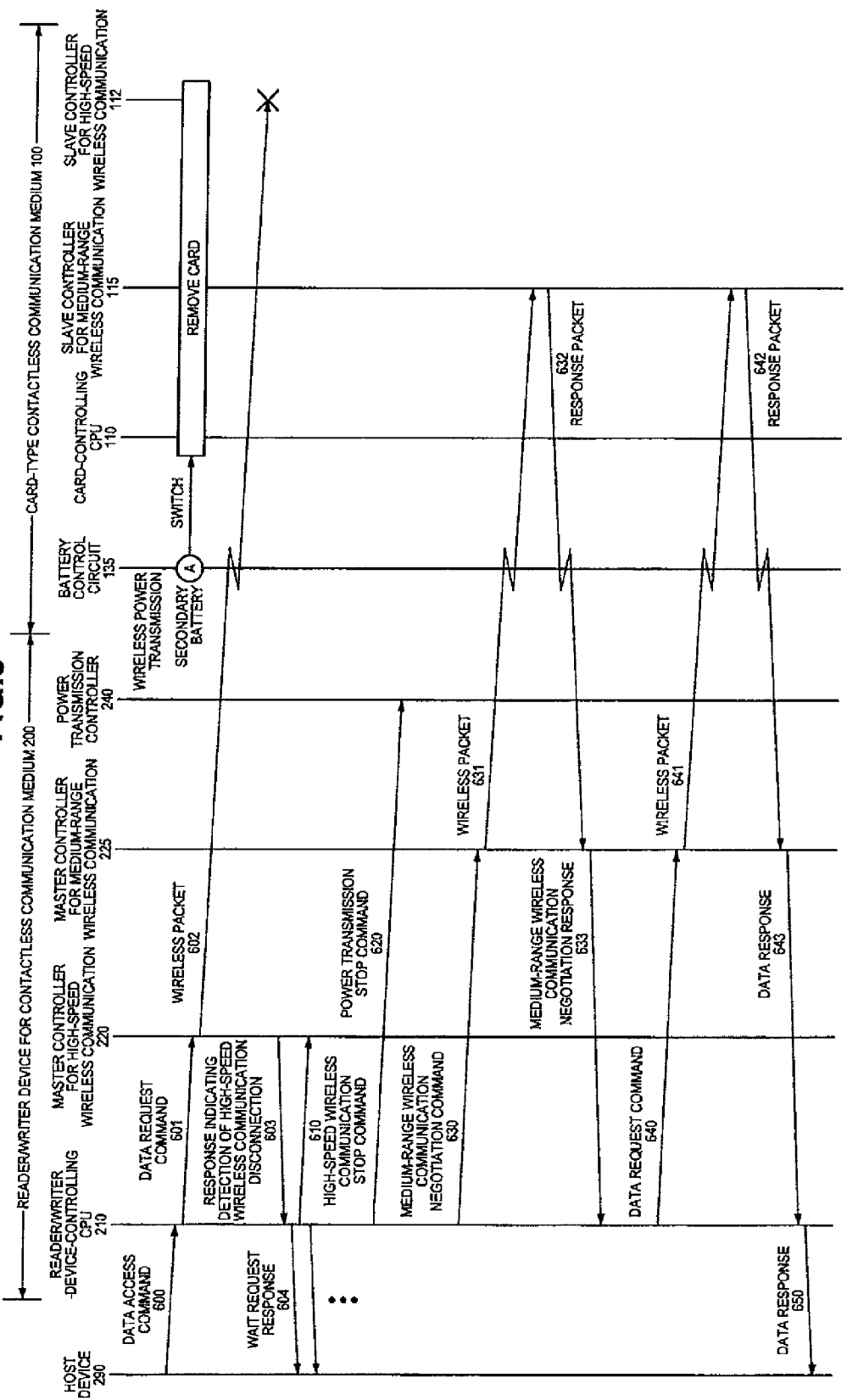

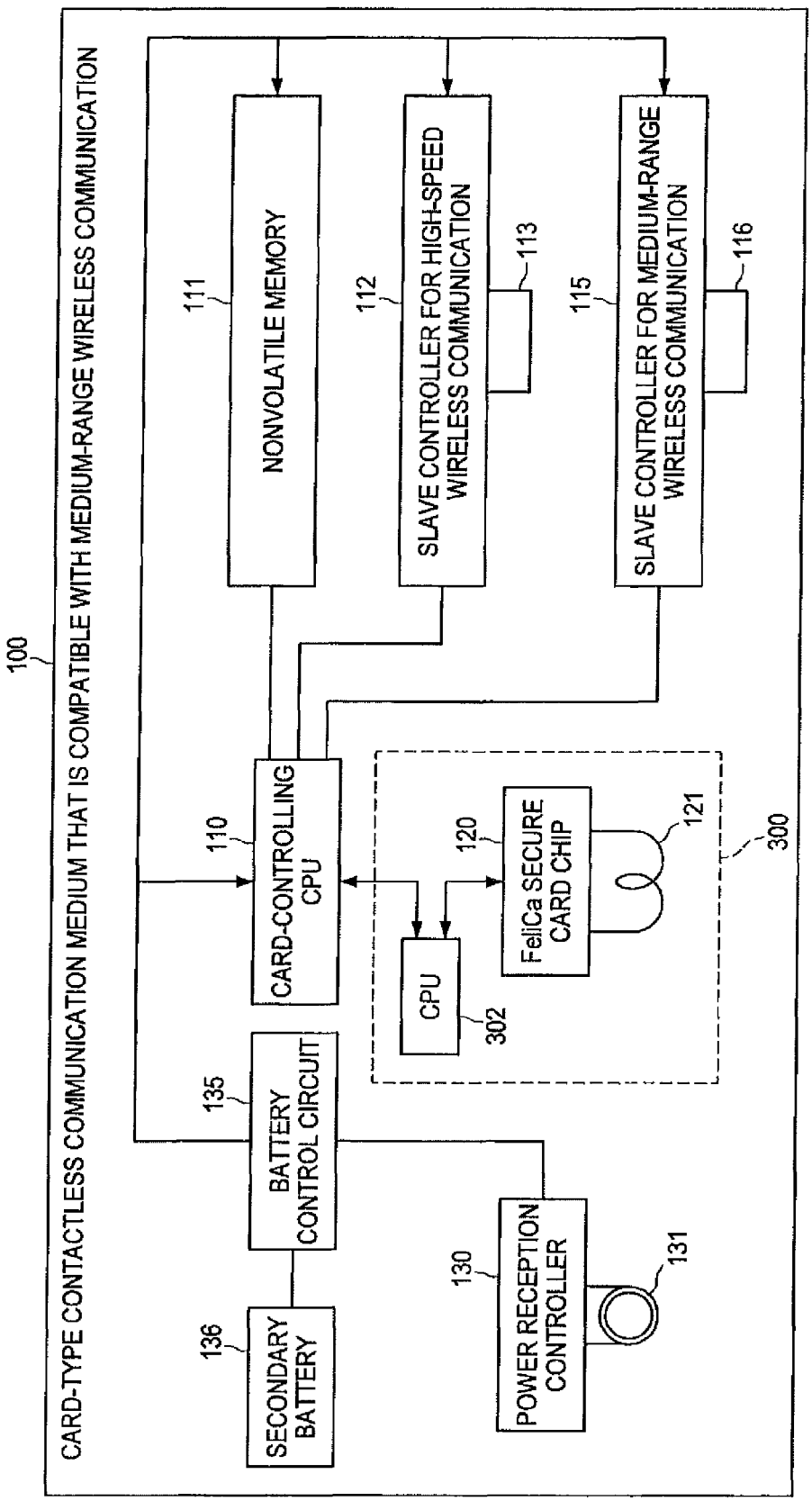

COMMUNICATION DEVICE, READER/WRITER DEVICE, COMMUNICATION SYSTEM, AND COMMUNICATION METHOD

CROSS-REFERENCE TO RELATED APPLICATION

The present application claims priority from Japanese Patent Application No. JP 2010-126017 filed in the Japanese Patent Office on Jun. 1, 2010, the entire content of which is incorporated herein by reference.

BACKGROUND OF THE INVENTION

1. Field of the Invention

The present invention relates to a communication device, a reader/writer device, a communication system, and a communication method.

2. Description of the Related Art

In recent years, close-proximity communication in which contactless wireless communication over a short distance is performed with an IC (Integrated Circuit) card has been used for electronic commuter passes and electronic money, for example. Thus, electronic commuter passes that use close-proximity communication and mobile phones with an electronic money function have come into widespread use. Close-proximity communication is standardized in, for example, ISO/IEC 14443 and ISO/IEC 18092 (hereinafter also referred to as NFC (Near Field Communication)).

Exemplary communication modes for performing communication that complies with the NFC standards include communication modes called Type A, Type B, and Type C. Type C is adopted for an IC card system called FeliCa® of Sony Corporation that is the applicant of the present application.

By the way, in the aforementioned Type C, a carrier of 13.56 MHz is adopted, and close-proximity communication is performed at a communication rate of 212 kbps (kilo bit per second) or 424 kbps. Meanwhile, in Types A and B, close-proximity communication is performed at a communication rate of 106 kbps, which is lower than the communication rate of Type C. As described above, as the communication rate of NFC is about several hundred kbps, which is not very high, NFC is not considered to be suitable for transmission of large-volume data such as image contents.

Meanwhile, NFC allows mutual authentication to be performed by identifying a communication party only by passing an IC card over an R/W (Reader/Writer). Thus, there has been proposed a handover in which communication is performed first with NFC, and thereafter the communication mode is switched to a communication mode with a communication rate that is higher than the communication rate of NFC, such as a wireless LAN or Bluetooth® (for example, see JP 2009-218845A).

By the way, recently, close-proximity communication with a communication rate that is higher than the communication rate of NFC has come into widespread use. TransferJet™ is one exemplary communication mode of such high-speed close-proximity communication. In TransferJet™, a carrier of 4.48 GHz is adopted, and close-proximity communication is performed at a maximum communication rate of 560 Mbps.

When TransferJet™ described above is applied to an IC card system, an IC card and an R/W, which reads data from and writes data to the IC card, would be able to rapidly transfer large-volume data such as image contents to each other.

When a communication mode of high-speed close-proximity communication such as TransferJet™ is applied to an IC card system, each of an R/W and an IC card would be able to identify its communication party only by passing the IC card over the R/W without using a handover. Thus, rapid transfer of large-volume data such as image contents is possible.

Meanwhile, JP 2003-284137A describes a technique in which a first communication mode such as PDC (Personal Digital Cellular) and a second communication mode such as W-CDMA (Wideband-Code Division Multiple Access) are used, and if the second communication mode becomes not available, communication with the first communication mode is presumed to start. In addition, JP 2005-117551A describes a technique in which a mobile communication terminal within a service area promptly determines if services of a base station are available so as to reduce the instantaneous interruption time of communication that would be caused by a handover or the like.

SUMMARY OF THE INVENTION

However, if a media card such as electronic money is moved away from a reader/writer, communication between the media card and the reader/writer can no longer be performed. Therefore, the media card should always be placed over the reader/writer, but there may be cases in which, if a reader/writer is built in the front part of a keyboard of a laptop personal computer and the keyboard is used while the media card is also used, the media card would interrupt.

Meanwhile, each of the techniques described in JP 2003-284137A and JP 2005-117551A is based on the presumption that communications with different base stations are performed with different communication modes, and are not based on a system in which communication is performed on a one-to-one basis between a single communication device and a corresponding reader/writer device.

In light of the foregoing, it is desirable to provide a novel and improved communication device, communication method, and communication system that allow, when data transfer is performed between a mobile communication device and a reader/writer device, the data transfer to be continuously performed even when the communication device and the reader/writer are moved away from each other.

According to an embodiment of the present invention, there is provided a communication device including a secure communication unit configured to perform secure communication with an external reader/writer device, the secure communication being secure close-proximity communication, a first communication unit configured to perform high-speed communication with the reader/writer device, the high-speed communication being close-proximity communication that is faster than the secure communication, a second communication unit configured to, when communication via the high-speed communication is disconnected, communicate with the reader/writer device with a communication mode that is different from a communication mode of the high-speed communication, a power transmission unit configured to receive power transmitted from the reader-writer device by power transmission, and a secondary battery configured to store the power received by the power transmission unit. The second communication unit may be configured to, when communication via the high-speed communication is disconnected, operate with the power stored in the secondary battery.

The second communication unit may be configured to, when communication via the high-speed communication is disconnected, negotiate with the reader/writer, and to, if the negotiation has been successful, communicate with the reader/writer device.

The communication device may further include a storage unit configured to store information about communication performed by each of the first communication unit and the second communication unit. The information stored in the storage unit may be used for the negotiation.

According to another embodiment of the present invention, there is provided a reader/writer device including a secure communication unit configured to perform secure communication with an external portable communication device, the secure communication being secure close-proximity communication, a first communication unit configured to perform high-speed communication with the portable communication device, the high speed communication being close-proximity communication that is faster than the secure communication, and a second communication unit configured to, when communication via the high-speed communication is disconnected, communicate with the portable communication device with a communication mode that is different from a communication mode of the high-speed communication.

The reader/writer device may further include a power transmission unit configured to transmit power to the portable communication device by power transmission. When communication via the high-speed communication is disconnected, transmission of power by the power transmission unit may be stopped.

When the portable communication device has not responded to data transmitted via the high-speed communication, the second communication unit may start to communicate with the portable communication device.

According to further another embodiment of the present invention, there is provided a communication system including a secure communication unit configured to perform secure communication with an external reader/writer device, the secure communication being secure close-proximity communication, a first communication unit configured to perform high-speed communication with the reader/writer device, the high-speed communication being close-proximity communication that is faster than the secure communication, a second communication unit configured to, when communication via the high-speed communication is disconnected, communicate with the reader/writer device with a communication mode that is different from a communication mode of the high-speed communication, and the reader/writer device configured to communicate with the portable communication device using one of the secure communication, the high-speed communication, and the communication with the different communication mode.

The reader/writer device may further include a power transmission unit configured to transmit power to the portable communication device by power transmission. When communication via the high-speed communication is disconnected, transmission of power by the power transmission unit may be stopped.

The portable communication device may further include a power transmission unit and a secondary battery, the power transmission unit being configured to receive the power transmitted from the reader/write device by the power transmission, and the secondary battery being configured to store the power received by the power transmission unit. The second communication unit may be configured to, when communication via the high-speed communication is disconnected, operate with the power stored in the secondary battery.

According to still another embodiment of the present invention, there is provided a communication method comprising the steps of causing a portable communication device and a reader/writer device to perform secure communication, the secure communication being secure close-proximity communication, causing the portable communication device and the reader/writer device to perform high-speed communication, the high-speed communication being close-proximity communication that is faster than the secure communication, and causing the portable communication device and the reader/writer device to, when communication via the high-speed communication is disconnected, perform communication with a communication mode that is different from a communication mode of the high-speed communication.

According to the embodiments of the present invention described above, when data transfer is performed between a mobile communication device and a reader/writer device, the data transfer can be continuously performed even when the communication device and the reader/writer are moved away from each other.

BRIEF DESCRIPTION OF THE DRAWINGS

FIG. 5 is a schematic diagram showing a data structure on the medium structure information of the contactless communication medium;

FIG. 6 is a sequence diagram showing a reconnection sequence of the contactless communication medium and the R/W; and FIG. 7 is a schematic diagram showing an exemplary configuration in which the contactless communication medium is an electronic device such as a mobile phone.

DETAILED DESCRIPTION OF THE EMBODIMENTS

Figure 1:
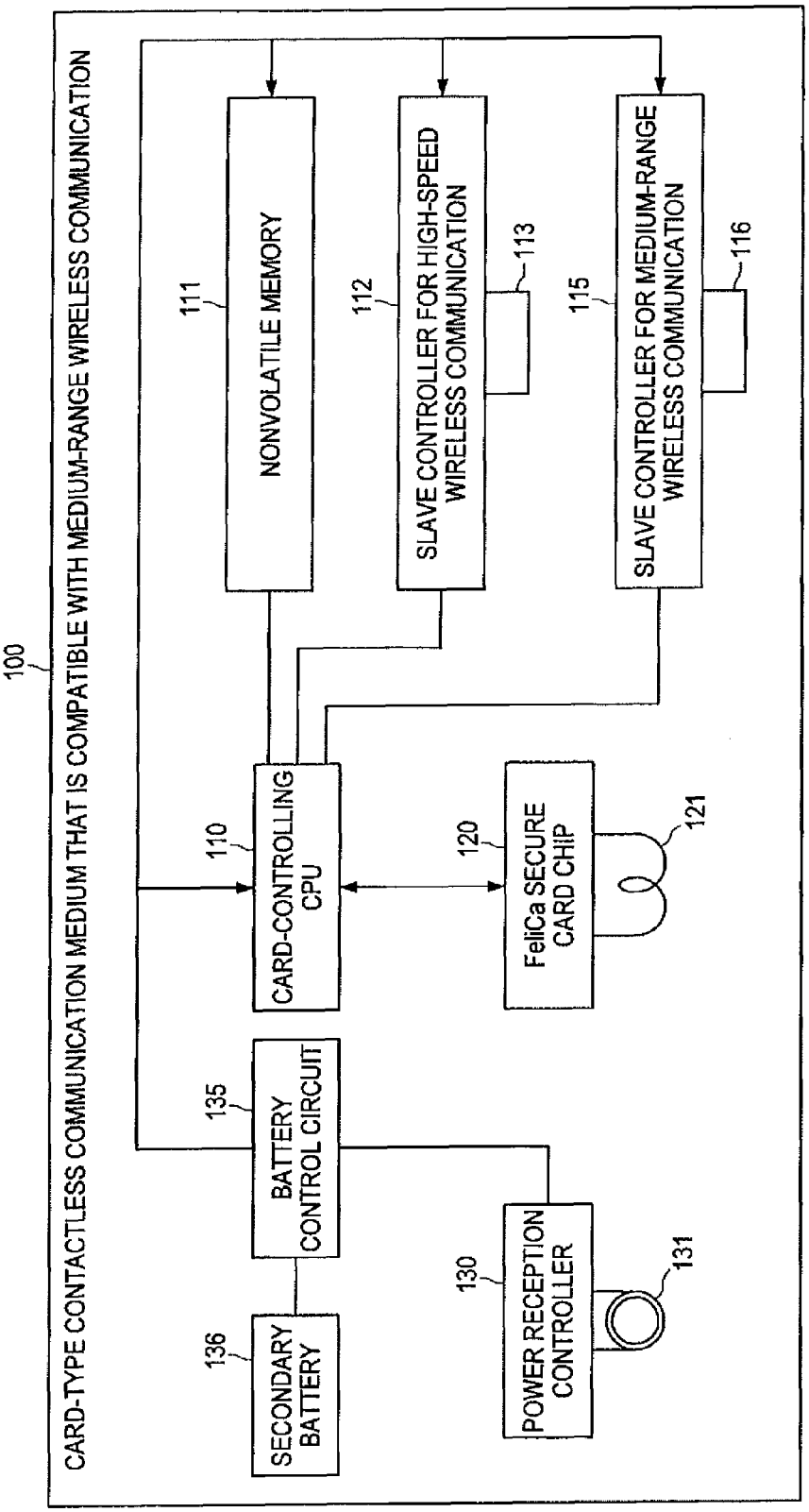
FIG. 1 is a block diagram showing an exemplary hardware configuration of a card-type contactless communication medium that is compatible with medium-range wireless communication.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Exemplary Configuration of Contactless Communication Medium 100
2. Exemplary Configuration of R/W 200
3. Process of Booting and Reconnecting Card-type Contactless Communication Medium
4. Process of Reconnecting R/W 200
5. Medium Structure Information of Contactless Communication Medium
6. Sequence of Reconnecting Contactless Communication Medium and Reader/Writer

[1. Exemplary Configuration of Contactless Communication Medium 100]

In a system in accordance with this embodiment, when a contactless communication medium 100 is passed over a reader/writer 200 (either in a contacting manner or a noncontacting manner), the contactless communication medium 100 and the reader/writer 200 mutually communicate with each other. The reader/writer 200 can be either a stand-alone device or be built in a host device 290 (e.g., a laptop personal computer) which is described later. The contactless communication medium 100 has mounted therein a rechargeable secondary battery 136 and a slave controller 115 (e.g., WiFi) for medium-range wireless communication, whereby it is possible to, once the contactless communication medium 100 has been passed over the reader/writer 200 and thus normally authenticated, continuously perform the communication even when the contactless communication medium is repositioned at a place away from the reader/writer 200.

FIG. 1 is a block diagram showing an exemplary hardware configuration of the card-type contactless communication medium 100 that is compatible with medium-range wireless communication. The contactless communication medium 100 includes a card-controlling CPU (Central Processing Unit) 110, nonvolatile memory 111, a slave controller 112 for high-speed wireless communication, an antenna 113 for high-speed wireless communication, a low-speed wireless communication chip 120, an antenna 121 for low-speed wireless communication, a power reception controller 130, a power reception antenna 131, a battery control circuit 135, a secondary battery 136, the slave controller 115 for medium-range wireless communication, and an antenna 116 for medium-range wireless communication.

The card-controlling CPU 110 is connected to the nonvolatile memory 111, the slave controller 112 for high-speed wireless communication, and the slave controller 115 for medium-range wireless communication via buses to control the nonvolatile memory 111, the slave controller 112 for high-speed wireless communication, and the slave controller 115 for medium-range wireless communication.

The card-controlling CPU 110 is also connected to the battery control circuit 135 to control the battery control circuit 135.

The nonvolatile memory 111 is, for example, high-capacity (e.g., 6 GB or 8 GB) NAND flash memory that, under the control of the card-controlling CPU 110, stores data such as contents provided from the card-controlling CPU 110, and the stored data is read and provided to the card-controlling CPU 110.

The slave controller 112 for high-speed wireless communication is connected to the antenna 113 for high-speed wireless communication, and functions as a second slave communication means that performs, provided that the communication rate of the low-speed wireless communication chip 120 (described later) is a first communication rate, close-proximity wireless communication (second communication, hereinafter also referred to as high-speed communication) with the R/W 200 (described later) at a communication rate (a second communication rate) that is higher than the first communication rate.

Herein, as an exemplary communication mode of the high-speed communication performed between the slave controller 112 for high-speed wireless communication and the R/W 200, TransferJet™ capable of high-speed close-proximity communication can be adopted. Besides, as other exemplary communication modes of the high-speed communication, a communication mode that complies with the high-speed wireless communication standards, such as a wireless LAN, a wireless USB (Universal Serial Bus), or Bluetooth® can be adopted.

Note that in this embodiment, TransferJet™ is adopted as a communication mode of the high-speed communication. Thus, in the high-speed communication, close-proximity communication at a maximum communication rate of 560 Mbps is performed with a carrier of 4.48 GHz.

The low-speed wireless communication chip 120 is connected to the antenna 121 for low-speed wireless communication, and functions as a first slave communication means that performs close-proximity wireless communication (first communication) with the R/W 200 at a predetermined communication rate (a first communication rate). The low-speed wireless communication chip 120 is a chip with a tamper-resistant function. Various information such as money information is stored in the low-speed wireless communication chip 120.

Herein, close-proximity communication performed between the low-speed wireless communication chip 120 and the R/W 200 is communication (hereinafter also referred to as low-speed communication) at a communication rate that is lower than the communication rate of the high-speed communication performed by the slave controller 112 for high-speed wireless communication. As an exemplary communication mode of the low-speed communication herein, FeliCa® capable of performing close-proximity communication at a predetermined communication rate can be adopted. Besides, as other exemplary communication modes of the low-speed communication, a communication mode (e.g., Type A or B) that complies with the wireless communication standards such as NFC can be adopted.

In this embodiment, FeliCa® is adopted as a communication mode of the low-speed communication. Thus, in the low-speed communication, close-proximity communication at a communication rate of 212 kbps is performed with a carrier of 13.56 MHz. When FeliCa® is adopted as a communication mode of the low-speed communication, secure communication can be performed as the low-speed communication and mutual authentication is also possible.

Herein, the close-proximity communication (low-speed communication) performed by the low-speed wireless communication chip 120 has a lower rate than the close-proximity communication (high-speed communication) performed by the slave controller 112 for high-speed wireless communication. Thus, high-speed operation is not required for the low-speed wireless communication chip 120 that performs such low-speed close-proximity communication. Thus, power required to operate the low-speed wireless communication chip 120 (power required for low-speed communication) is lower than that required to operate the slave controller 112 for high-speed wireless communication (power required for high-speed communication).

For example, when FeliCa® is adapted as a communication mode of the low-speed communication, and TransferJet™ is adopted as a communication mode of the high-speed communication, power required to perform communication with FeliCa® is lower than that required to perform communication with TransferJet™ by about two digits. Therefore, the low-speed wireless communication chip 120 performs low-speed communication by operating with power, which is obtained from an RF signal for low-speed communication from the R/W 200, and received by the antenna 121 for low-speed wireless communication, as a power source.

The power reception controller 130 is connected to the power reception antenna 131. In addition, the power reception controller 130 is connected to the battery control circuit 135. The battery control circuit 135 is connected to the secondary battery 136.

The power reception controller 130 receives power, which is transmitted from the R/W 200 by wireless power transmission, via the power reception antenna 131, and supplies the power to the battery control circuit 135. The power transmitted by wireless power transmission is supplied from the battery control circuit 135 to the card-controlling CPU 110, the nonvolatile memory 111, the slave controller 112 for high-speed wireless communication, and the slave controller 115 for medium-range wireless communication. In addition, the power transmitted by wireless power transmission is also supplied from the battery control circuit 135 to the secondary battery 136.

Each of the card-controlling CPU 110, the nonvolatile memory 111, the slave controller 112 for high-speed wireless communication, and the slave controller 115 for medium-range wireless communication operates by receiving the power supplied from the power reception controller 130 as a power source. The slave controller 112 for high-speed wireless communication performs an operation for high-speed communication. The slave controller 115 for medium-range wireless communication performs an operation for medium-range wireless communication.

Note that as an exemplary transmission scheme of the wireless power transmission performed between the power reception controller 130 and the R/W 200, electromagnetic induction can be used. Besides, as another exemplary transmission scheme of the wireless power transmission, a wireless power transmission scheme such as magnetic resonance can be used.

Wireless power transmission using electromagnetic induction is superior in power transmission efficiency to wireless power transmission using magnetic resonance, but is inferior in tolerance for displacement of antennas (displacement of an antenna for transmitting power with respect to an antenna for receiving power). Conversely, wireless power transmission using magnetic resonance is superior in tolerance for displacement of antennas to wireless power transmission using electromagnetic induction, but is inferior in power transmission efficiency.

As described above, each of the card-controlling CPU (Central Processing Unit) 110, the nonvolatile memory 111, the slave controller 112 for high-speed wireless communication, and the slave controller 115 for medium-range wireless communication in the contactless communication medium 100 operates with the power sent (transmitted) from the R/W 200 by wireless power transmission, while the low-speed wireless communication chip 120 operates with power obtained from an RF signal for low-speed communication from the R/W 200.

The battery control circuit 135, when supplied with power from the power reception controller 130, supplies the power to the card-controlling CPU 110, the nonvolatile memory 111 for storing data, the slave controller 112 for high-speed wireless communication, and the slave controller 115 for medium-range wireless communication. The battery control circuit 135 also supplies the power to the secondary battery 136 to charge it.

The battery control circuit 135, when not supplied with power from the power reception controller 130, supplies power from the secondary battery 136 to the card-controlling CPU 110, the nonvolatile memory 111 for storing data, the slave controller 112 for high-speed wireless communication, and the slave controller 115 for medium-range wireless communication. As described above, the low-speed wireless communication chip 120 generates an electromotive force with the RF received by the antenna 121 for low-speed wireless communication, and can thus operate independently of the power reception controller 130 and the battery control circuit 135 in terms of power.

The contactless communication medium 100 can be not only a medium such as an electronic money card but also an electronic device such as a mobile phone. FIG. 7 is a schematic diagram showing an exemplary configuration in which the contactless communication medium 100 is an electronic device such as a mobile phone. In this case, as shown in FIG. 7, the low-speed wireless communication chip 120 can be mounted on a SIM card 300 that the mobile phone has. The SIM card 300 is constructed to be removable from the contactless communication medium 100. The low-speed wireless communication chip 120 of the SIM card 300 is configured to be capable of communicating with the card-controlling CPU 110 provided in the body of the mobile phone. In addition, as shown in FIG. 7, the SIM card 300 can be provided with a CPU 302 so that the low-speed wireless communication chip 120 and the card-controlling CPU 110 can communicate with each other via the CPU 302.

[2. Exemplary Configuration of R/W 200]

Figure 2:
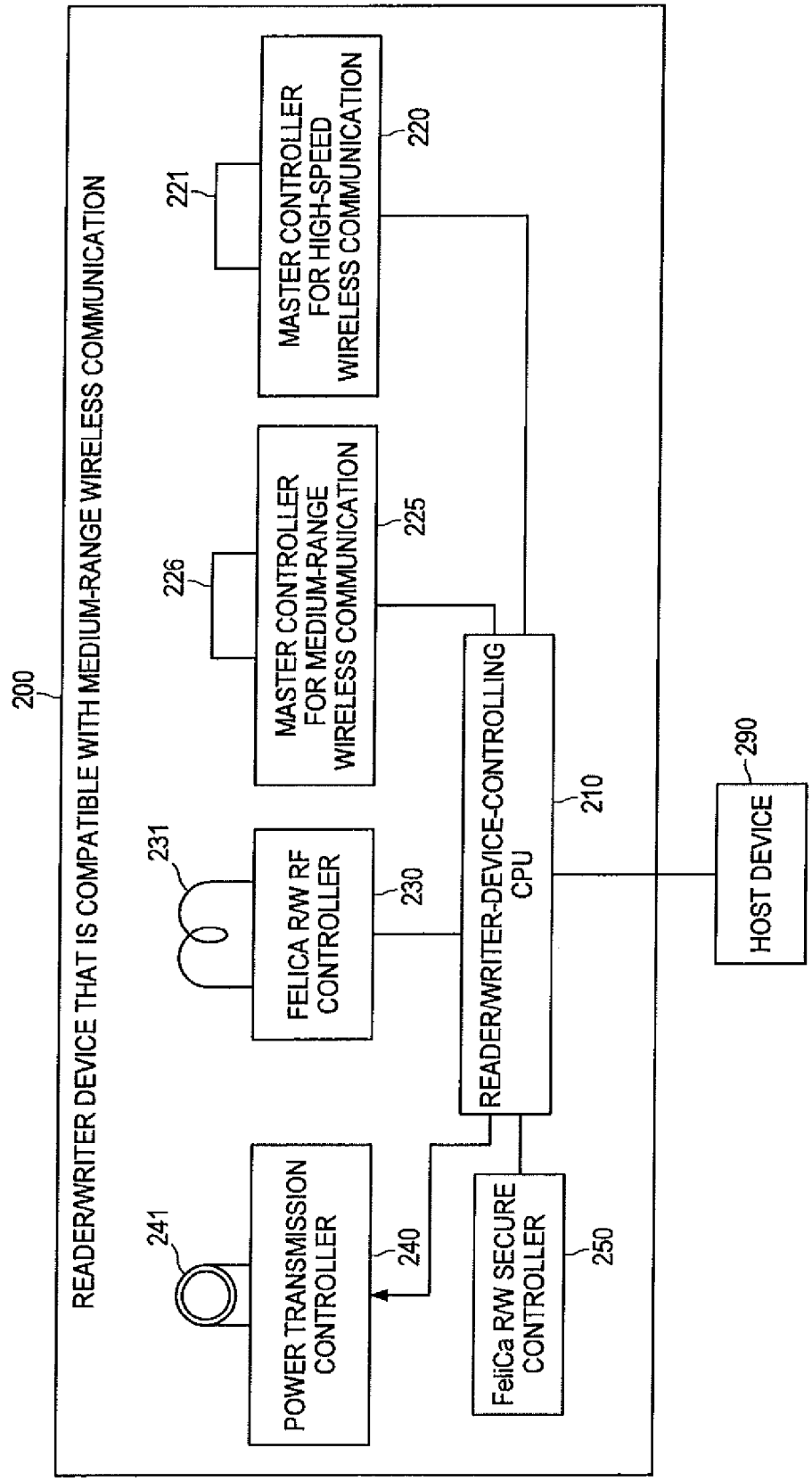
FIG. 2 is a block diagram showing an exemplary hardware configuration of an R/W.

FIG. 2 is a block diagram showing an exemplary hardware configuration of the R/W 200. The R/W 200 includes an R/W-controlling CPU 210, a master controller 220 for high-speed wireless communication, an antenna 221 for high-speed wireless communication, a master controller 225 for medium-range wireless communication, an antenna 226 for medium-range wireless communication, a controller (FeliCa R/W RF controller) 230 for low-speed wireless communication, an antenna (FeliCa R/W antenna) 231 for low-speed wireless communication, a power transmission controller 240, a power transmission antenna 241, and a controller 250 for secure processing.

The R/W-controlling CPU 210 is connected to the host device 290 via a predetermined bus such as a USB, for example. Further, the R/W-controlling CPU 210 is also connected to the master controller 220 for high-speed wireless communication, the master controller 225 for medium-range wireless communication, the controller 230 for low-speed wireless communication, and the controller 250 for secure processing via buses. The R/W-controlling CPU 210 can control these components under the control of the host device 290 or the like.

The R/W-controlling CPU 210 is also connected to the power transmission controller 240 via a single general-purpose I/O (Input/Output) (interface) to control the power transmission controller 240.

Herein, the controller (FeliCa R/W secure controller) 250 for secure processing is a chip with a tamper-resistant function.

The master controller 220 for high-speed wireless communication is connected to the antenna 221 for high-speed wireless communication, and functions as a second master communication means that performs close-proximity wireless communication as the high-speed communication with the slave controller 112 for high-speed wireless communication of the contactless communication medium 100 via the antenna 221 for high-speed wireless communication.

The controller 230 for low-speed wireless communication is connected to the antenna 231 for low-speed wireless communication, and functions as a first master communication means that performs close-proximity wireless communication as the low-speed communication with the low-speed wireless communication chip 120 of the contactless communication medium 100 via the antenna 231 for low-speed wireless communication. That is, the controller 230 for low-speed wireless communication outputs an RF signal via the antenna 231 for low-speed wireless communication for polling purposes.

Meanwhile, when the contactless communication medium 100 is passed over the R/W 200 and the contactless communication medium 100 is thus brought in proximity to the R/W 200, the low-speed wireless communication chip 120 of the contactless communication medium 100 returns a response to the polling from the controller 230 for low-speed wireless communication of the R/W 200. This response is transmitted using load modulation.

The controller 230 for low-speed wireless communication of the R/W 200, upon receiving the response from the low-speed wireless communication chip 120 of the contactless communication medium 100, informs the R/W-controlling CPU 210 of the reception of the response. Accordingly, the R/W-controlling CPU 210 recognizes that the contactless communication medium 100 has been brought in proximity to the R/W 200. Herein, if FeliCa® is used as a communication mode of the low-speed communication as described above, for example, the controller 230 for low-speed wireless communication is a FeliCa® R/W.

The power transmission controller 240 is connected to the power transmission antenna 241, and transmits power, which is necessary for the contactless communication medium 100 to perform high-speed communication, via the power transmission antenna 241 by wireless power transmission. In addition, the power transmission controller 240 can, when the high-speed communication performed by the master controller 220 for high-speed wireless communication is disconnected, stop the power transmission with an instruction issued from the R/W-controlling CPU 210.

The R/W-controlling CPU 210 is connected to the host device 290 via a bus. The host device 290 can be a device such as, for example, a personal computer (PC) or a television receiver. This embodiment is based on the assumption that a bus connecting the R/W 200 and the host device 290 is a USB. However, the USB can be replaced with another bus. Note that power that is necessary for the R/W 200 to operate is supplied to the R/W 200 from the host device 290 or a power source (not shown).

[3. Process of Booting and Reconnecting Card-Type Contactless Communication Medium]

Figure 3:
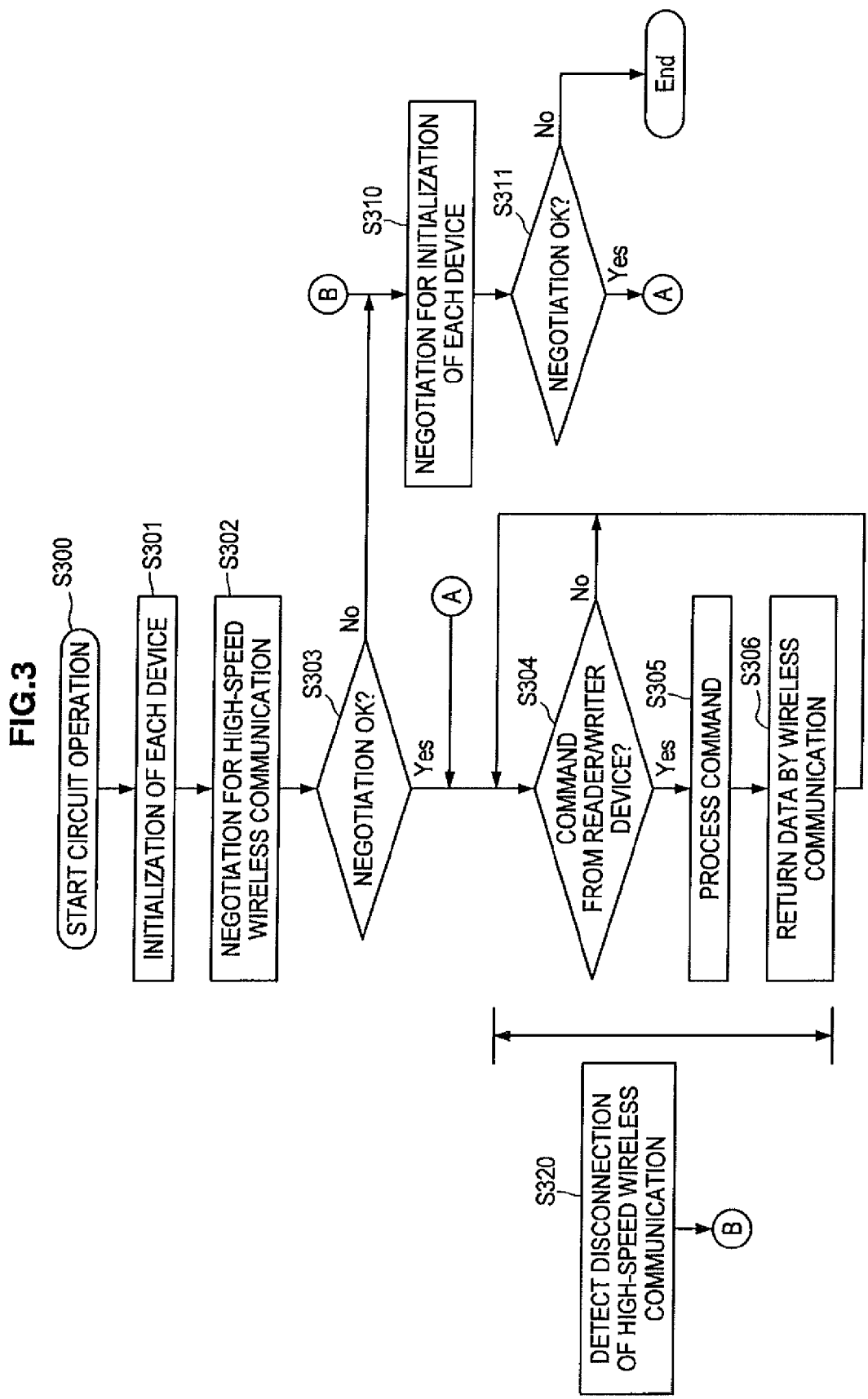
FIG. 3 is a flowchart showing a process of booting and reconnecting the contactless communication medium.

FIG. 3 is a flowchart showing a process of booting and reconnecting the contactless communication medium 100. First, in step S300, a process of the contactless communication medium 100 is started. It is assumed that pre-negotiation using FeliCa has already been completed before the process of step S300.

Next, in step S301, initialization of each component in the contactless communication medium 100 is performed. Next, in step S302, a negotiation process for high-speed wireless communication is performed. Next, in step S303, whether the negotiation has succeeded or failed is determined upon time-out, for example. If the negotiation has succeeded, the process proceeds to step S304, and if not, the process proceeds to step S310.

In step S304, the contactless communication medium 100 enters a standby mode for receiving an R/W command, and, upon receiving a command from the R/W, proceeds to step S305 to process the command. After step S305, the process proceeds to step S306, upon which data is returned to the R/W 200 by high-speed wireless or medium-range wireless communication. After step S306, the process returns to step S304.

Meanwhile, if the negotiation for high-speed wireless communication has failed in step S303, negotiation for medium-range wireless communication is performed next. In that case, whether the negotiation for medium-range wireless communication has succeeded or failed is determined upon time-out, for example, in the next step S311. Then, if the negotiation for medium-range wireless communication has succeeded, the process proceeds to step S304 (symbol A shown in FIG. 3), and if not, the process is stopped (End).

In step S320, if disconnection of the high-speed wireless communication is detected during steps S304 to S306, the process proceeds to step S310 (symbol B shown in FIG. 3), so that negotiation for medium-range communication is attempted. Herein, power supply in the contactless communication medium 100 is continuously performed with the function of the battery control circuit 135, either by the wireless power transmission or by the built-in secondary battery 136. Therefore, it is not particularly necessary for the contactless communication medium 100 (software) to recognize switching of the power supply.

[4. Process of Reconnecting R/W 200]

Figure 4:
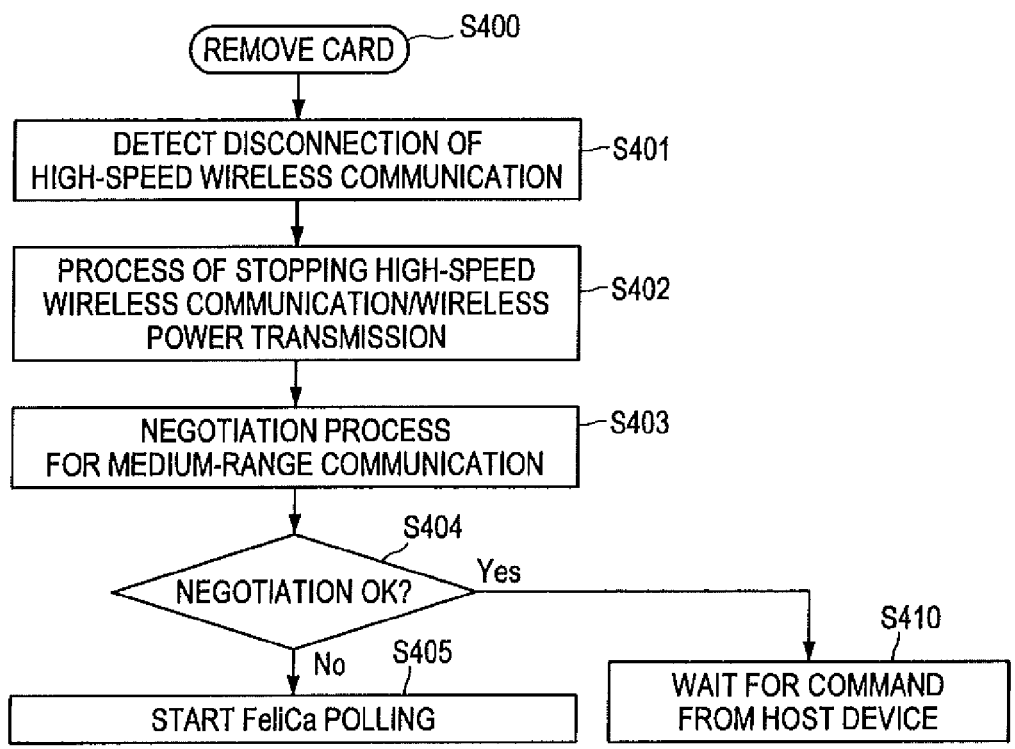
FIG. 4 is a schematic diagram showing a flowchart of reconnection of the R/W.

FIG. 4 is a schematic diagram showing a flowchart of reconnection of the R/W 200. First, in step S400, the contactless communication medium 100 is placed sufficiently away from the R/W 200, and thus the contactless communication medium 100 is removed from the R/W 200. In the next step S401, disconnection of the high-speed wireless communication is detected.

In the next step S402, the high-speed wireless communication and the wireless power transmission are stopped. In the next step S403, negotiation for medium-range wireless communication is performed. In the next step S404, whether the negotiation has succeeded or failed is determined upon time-out, for example. If the negotiation has succeeded, the process proceeds to step S410, and if not, the process proceeds to step S405.

In step S405, FeliCa polling for detecting the next card is started as the negotiation has previously failed. Meanwhile, in step S410, the R/W 200 enters a standby mode for receiving a command from the host device 290 as the negotiation has succeeded. Thus, medium-range wireless communication is used for the subsequent wireless communication.

[5. Medium Structure Information of Contactless Communication Medium]

FIG. 5 is a schematic diagram showing a data structure on the medium structure information of the contactless communication medium 100. The structure information shown in FIG. 5 is information on the contactless communication medium 100 such as the structure and functions of the contactless communication medium 100. The contactless communication medium 100 has stored therein structure information of the contactless communication medium 100.

The medium structure information of the contactless communication medium 100 is stored in built-in memory (non-volatile memory, not shown) of the low-speed wireless communication chip 120 with tamper-resistant properties.

The medium structure information includes information such as, for example, a high-speed wireless communication revision 510, a high-speed wireless communication mode 511, a medium-range wireless communication revision 520, a medium-range wireless communication mode 521, a medium-range wireless communication protocol 523, a medium-range wireless communication antenna shape 524, and medium-range wireless communication attributes 525, as shown in FIG. 5.

Information shown in FIG. 5 will now be described in detail. The high-speed wireless communication revision 510 represents a revision number (revision information) that is assigned to the high-speed communication performed by the contactless communication medium 100. The high-speed wireless communication mode 511 represents protocols of a physical layer and a link layer of a communication mode of the high-speed communication that is performed by the contactless communication medium 100. As a communication mode of the high-speed communication herein, TransferJet™, a wireless USB, Bluetooth®, or the like can be used as described above.

The medium-range wireless communication revision 520 represents a revision number (revision information) assigned to the medium-range communication that is performed by the contactless communication medium 100. The medium-range wireless communication mode 521 represents a communication mode of the medium-range communication that is performed by the contactless communication medium 100. As a communication mode of the medium-range communication herein, Bluetooth®, a wireless USB, Wi-Fi, or the like can be used, for example. The medium-range wireless communication protocol 523 represents communication protocols that are used for the medium-range wireless communication, specifically, protocols of a physical layer and a link layer of the medium-range wireless communication.

The medium-range wireless communication antenna shape 524 represents information on the antenna 116 for medium-range wireless communication of the contactless communication medium 100, and includes an arrangement state of the antenna 116 for medium-range wireless communication. The arrangement state of the antenna 116 for medium-range wireless communication includes the position of the antenna 116 for medium-range wireless communication on the contactless communication medium 100, and the shape of the antenna 116 for medium-range wireless communication.

The medium-range wireless communication attributes 525 represent auxiliary information that is necessary for negotiation for medium-range wireless communication. In the case of Wi-Fi, the medium-range wireless communication attributes 525 include information such as SSID, an encryption scheme, and a key.

In addition to the information shown in FIG. 5, the medium structure information also includes information such as a medium revision, a structure information revision, structure information parity, individual medium ID, area division information, nonvolatile memory size, maximum power consumption, high-speed communication antenna information, a wireless power transmission revision, a wireless power transmission scheme, and wireless power transmission antenna information.

For example, in the structure information stored in the low-speed wireless communication chip 120 of the contactless communication medium 100, the medium revision represents a revision number assigned to the contactless communication medium 100. The structure information revision represents a revision number assigned to the medium structure information. The value of the medium revision increases each time an alteration is made to the contactless communication medium 100, while the value of the structure information revision increases each time an alteration is made to the medium structure information.

The structure information parity is parity for the entire medium structure information, and is used to check the validity of the medium structure information. The individual medium ID is a unique ID assigned to the contactless communication medium 100. For the individual medium ID, 128-bit GUID (Globally Unique IDentifier) or the like can be used, for example. The area division information represents how the storage area of the nonvolatile memory 111 of the contactless communication medium 100 is divided. That is, the storage area of the nonvolatile memory 111 can be used by being divided into storage areas for various attributes such as a storage area for storing plain text data, a storage area for storing encrypted data, which is obtained by encrypting the plain text data, and a protected content area for storing protected contents that are protected by DRM (Digital Rights Management) such as AACS (Advanced Access Content System).

The area division information includes, when the storage area of the nonvolatile memory 111 is divided into storage areas for various attributes, information for identifying a storage area for each attribute, and the like. The nonvolatile memory size represents the total capacity of the nonvolatile memory 111. The maximum power consumption represents the maximum power consumed when the contactless communication medium 100 performs high-speed communication.

The high-speed communication antenna information is information on the antenna 113 for high-speed wireless communication of the contactless communication medium 100, and includes the arrangement state of the antenna 113 for high-speed wireless communication. The arrangement state of the antenna 113 for high-speed wireless communication includes the position of the antenna 113 for high-speed wireless communication on (a card bottom member of) the contactless communication medium 100, and the shape of the antenna 113 for high-speed wireless communication.

The wireless power transmission revision represents a revision number assigned to wireless power transmission that allows the contactless communication medium 100 to be supplied with power (wireless power transmission that the contactless communication medium 100 supports).

The wireless power transmission scheme represents a scheme of the wireless power transmission that allows the contactless communication medium 100 to be supplied with power. This scheme includes information to the effect that the wireless power transmission is performed with electromagnetic induction, magnetic resonance, or the like. The wireless power transmission antenna information is information on the power reception antenna 131 of the contactless communication medium 100, and includes the arrangement state of the power reception antenna 131.

The aforementioned medium structure information is stored in the built-in memory of the low-speed wireless communication chip 120 of the contactless communication medium 100, as described above.

When the contactless communication medium 100 and the R/W 200 have been brought in proximity to each other, the contactless communication medium 100 transmits the medium structure information in the low-speed communication performed between the low-speed wireless communication chip 120 of the contactless communication medium 100 and the controller 230 for low-speed wireless communication of the R/W 200. The R/W 200, in turn, receives the medium structure information of the contactless communication medium 100 transmitted from the contactless communication medium 100.

Note that tampering of the medium structure information can be prevented by adopting an IC chip with tamper-resistant properties as the low-speed wireless communication chip 120 as described above.

[6. Sequence of Reconnecting Contactless Communication Medium 100 and R/W 200]

FIG. 6 is a sequence diagram showing a sequence of reconnecting the contactless communication medium 100 and the R/W 200. In FIG. 6, it is assumed that a mutual authentication process using FeliCa communication immediately after the contactless communication medium 100 was passed over the R/W 200 has already been completed. Further, it is also assumed that the card medium structure information 500 contained in the low-speed wireless communication chip 120 has already been read into the R/W 200 using low-speed (FeliCa) communication. Furthermore, it is also assumed that data communication using high-speed wireless communication is normally conducted. In such a state, description will be made now of an operation in which the contactless communication medium 100 is moved away from the R/W 200 so that the contactless communication medium 100 is removed (an operation of cancelling the communication).

First, as shown in FIG. 6, a data access command 600 is transmitted from the host device 290 to the R/W-controlling CPU 210. This command is, for example, a command for accessing data such as a read access command or a write access command. Then, assume a case in which the contactless communication medium 100 is moved away from the R/W 200 and thus removed from the R/W 200 at the transmission timing of the data access command 600 (symbol A shown in FIG. 6).

The contactless communication medium 100 has been supplied with power by wireless power transmission until this point, but at this timing, a switch of the battery control circuit 135 is switched, whereby power supply with the internal secondary battery 136 begins.

The R/W-controlling CPU 210, upon receiving the data access command 600, transmits a data request command 601 to the master controller 220 for high-speed wireless communication. The master controller 220 for high-speed wireless communication transmits a wireless packet 602. However, as the high-speed wireless communication has been disconnected with the removal of the contactless communication medium 100, no response would be obtained from the contactless communication medium 100. Thus, the master controller 220 for high-speed wireless communication transmits a response 603 indicating the detection of the disconnection of the high-speed communication to the R/W-controlling CPU 210.

The R/W-controlling CPU 210, in order to ensure continuous data access, returns a wait request response 604 to the host device 290, to inform the host device 290 of the extension of the processing time. The R/W-controlling CPU 210 respectively transmits a high-speed wireless communication stop command 610 and a power transmission stop command 620 to the master controller 220 for high-speed wireless communication and the power transmission controller 240, thereby terminating each device.

Next, the R/W-controlling CPU 210 attempts negotiation for medium-range wireless communication. For the negotiation herein, information included in the card medium structure information 500, which has already been read from the contactless communication medium 100, is used.

The R/W-controlling CPU 210 transmits a medium-range wireless communication negotiation command 630 to the master controller 225 for medium-range wireless communication. For the negotiation herein, information included in the medium-range wireless communication attributes 525 is used.

The master controller 225 for medium-range wireless communication, upon receiving the medium-range wireless communication negotiation command 630, transmits a wireless packet 631 including a negotiation request. The slave controller 115 for medium-range wireless communication, upon receiving the wireless packet 631, returns a response packet 632 indicating the normal completion of the negotiation.

The master controller 225 for medium-range wireless communication, upon receiving the response packet 632, returns a medium-range wireless communication negotiation response 633 to the R/W-controlling CPU 210.

The R/W-controlling CPU 210, upon receiving the medium-range wireless communication negotiation response 633, transmits a data request command 640 to the master controller 225 for medium-range wireless communication to access data.

The master controller 225 for medium-range wireless communication, upon receiving the data request command 640, transmits a wireless packet 641. The slave controller 115 for medium-range wireless communication, upon receiving the wireless packet 641, analyzes a read/write command contained in the wireless packet 641, for example, and accesses the nonvolatile memory 111 as needed to return a response packet 642.

The master controller 225 for medium-range wireless communication, upon receiving the response packet 642, returns a data response 643 to the R/W-controlling CPU 210. At this timing, the R/W-controlling CPU 210 returns a data response 650 for returning a necessary data response to the host device 290.

As described above, with the process shown in FIG. 6, communication can be continuously performed even when the contactless communication medium 100, which has been once passed over the R/W 200, is moved away from the R/W 200.

As described above, according to this embodiment, communication can be maintained even when the contactless communication medium 100 is moved away from the R/W 200 so long as the contactless communication medium 100 has been once passed over the R/W 200. Thus, when communication is performed between the contactless communication medium 100 and a personal computer, for example, the contactless communication medium 100 can be moved to a non-interrupted place.

Although the preferred embodiments of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

What is claimed is:

1. A communication device comprising:
   a close-proximity communication unit configured to perform a low-speed close-proximity communication with an external reader/writer device;
   a first communication unit configured to perform high-speed close-proximity communication with the reader/writer device, that is faster than the low-speed close-proximity communication;
   a second communication unit configured to, in response to a negotiation request from the reader/writer device when disconnection of communication via the high-speed close-proximity communication is detected at the reader/writer device, negotiate for medium-range communication and perform the medium-range communication with the reader/writer device;
   a power transmission unit configured to receive power transmitted from the reader/writer device by power transmission; and
   a secondary battery configured to store the power received by the power transmission unit,
   in which the second communication unit is configured to, when communication via the high-speed close-proximity communication is disconnected, operate with the power stored in the secondary battery, and in which the medium-range communication corresponds to a communication mode that is different from that of the high-speed close-proximity communication and from that of the low-speed close-proximity communication, such that the communication device is configured to perform three different types of communication.

2. The communication device according to claim 1, wherein the second communication unit is configured to, if the negotiation has been successful, communicate with the reader/writer device by the medium-range communication.

3. The communication device according to claim 2, further comprising a storage unit configured to store information about communication performed by each of the first communication unit and the second communication unit, wherein the information stored in the storage unit is used for the negotiation.

4. A reader/writer device comprising:
a close-proximity communication unit configured to perform a low-speed close-proximity communication with an external portable communication device;
a first communication unit configured to perform high-speed close-proximity communication with the portable communication device, that is faster than the low-speed close-proximity communication; and
a second communication unit configured to, when disconnection of communication via the high-speed communication is detected at the reader/writer device, negotiate for medium-range communication and perform the medium-range communication with the portable communication device,
in which the medium-range communication corresponds to a communication mode that is different from that of the high-speed close-proximity communication and from that of the low-speed close-proximity communication, such that the reader/writer is configured to perform three different types of communication.

5. The reader/writer device according to claim 4, further comprising a power transmission unit configured to transmit power to the portable communication device by power transmission, wherein when communication via the high-speed close-proximity communication is disconnected, transmission of power by the power transmission unit is stopped.

6. The reader/writer device according to claim 4, wherein when the portable communication device has not responded to data transmitted via the high-speed close-proximity communication, the second communication unit starts to communicate by the medium-range communication with the portable communication device.

7. A communication system comprising:
a portable communication device having
(i) a close-proximity communication unit configured to perform a low-speed close-proximity communication with an external reader/writer device;
(ii) a first communication unit configured to perform high-speed close-proximity communication with the reader/writer device, that is faster than the low-speed close-proximity communication; and
(iii) a second communication unit configured to, in response to a negotiation request from the reader/writer device when disconnection of communication via the high-speed close-proximity communication is detected at the reader/writer device, negotiate for medium-range communication and perform the medium-range communication with the reader/writer device,
in which the medium-range communication corresponds to a communication mode that is different from that of the high-speed close-proximity communication and from that of the low-speed close-proximity communication, such that the portable communication device is configured to perform three different types of communication; and
the reader/writer device configured to communicate with the portable communication device using one of the low-speed close-proximity communication, the high-speed close-proximity communication, and the medium-range communication.

8. The communication system according to claim 7, wherein the reader/writer device further includes a power transmission unit configured to transmit power to the portable communication device by power transmission, wherein when communication via the high-speed close-proximity communication is disconnected, transmission of power by the power transmission unit is stopped.

9. The communication system according to claim 8, wherein the portable communication device further includes a power transmission unit and a secondary battery, the power transmission unit being configured to receive the power transmitted from the reader/writer device by the power transmission, and the secondary battery being configured to store the power received by the power transmission unit, and wherein the second communication unit is configured to, when communication via the high-speed close-proximity communication is disconnected, operate with the power stored in the secondary battery.

10. A communication method comprising the steps of:
causing a portable communication device and a reader/writer device to perform low-speed close-proximity communication;
causing the portable communication device and the reader/writer device to perform high-speed close-proximity communication that is faster than the low-speed close-proximity communication; and
causing the portable communication device and the reader/writer device to, when disconnection of communication via the high-speed close-proximity communication is detected, negotiate for medium-range communication and perform the medium-range communication,
in which the medium-range communication corresponds to a communication mode that is different from that of the high-speed close-proximity communication and from that of the low-speed close-proximity communication, such that the portable communication device and the reader/writer are caused to perform three different types of communication.

* * * * *